United States Patent [19]

Frick

[11] Patent Number: 5,163,326

[45] Date of Patent: Nov. 17, 1992

[54] LINE PRESSURE COMPENSATOR FOR A PRESSURE TRANSDUCER

[75] Inventor: Roger L. Frick, Clear Lake, Minn.

[73] Assignee: Rosemount Inc., Eden Prairie, Minn.

[21] Appl. No.: 667,320

[22] Filed: Mar. 8, 1991

[51] Int. Cl.⁵ .......................... G01L 7/08; G01L 9/12; G01L 19/04

[52] U.S. Cl. ...................... 73/708; 73/718; 73/724; 361/283

[58] Field of Search .......... 73/718, 724, 708; 361/283; 128/722; 324/610

[56] References Cited

U.S. PATENT DOCUMENTS

| | | | |
|---|---|---|---|
| 4,370,890 | 2/1983 | Frick | 73/718 |
| 4,791,352 | 12/1988 | Frick et al. | 73/718 |
| 4,878,012 | 10/1989 | Schulte et al. | 324/60 R |

FOREIGN PATENT DOCUMENTS

| | | | |
|---|---|---|---|
| 3414896 | 10/1985 | Fed. Rep. of Germany | 73/718 |
| 4-7460 | 2/1992 | Japan | |

Primary Examiner—Donald O. Woodiel
Attorney, Agent, or Firm—Kinney & Lange

[57] ABSTRACT

In a two wire transmitter, a capacitive sensor senses differential pressure and provides a differential pressure signal based on the differential pressure sensed. The differential pressure signal varies with variations in static pressure. A capacitive compensator has a capacitive value substantially unaffected by variations in static pressure, and is coupled to the capacitive sensor to compensate the differential pressure signal for variations due to variations in the static pressure.

22 Claims, 2 Drawing Sheets

LINE PRESSURE COMPENSATOR FOR A PRESSURE TRANSDUCER

INCORPORATION BY REFERENCE

The following patents are hereby incorporated by reference:

The Schulte et al U.S. Pat. No. 4,878,012, issued on Oct. 31, 1989 and assigned to the same assignee as the present invention.

The Frick U.S. Pat. No. 4,370,890, issued on Feb. 1, 1983, assigned to the same assignee as the present invention.

The Frick et al U.S. Pat. No. 4,791,352, issued on Dec. 13, 1988, assigned to the same assignee as the present invention.

BACKGROUND OF THE INVENTION

The present invention involves a differential pressure sensor. More particularly, the present invention deals with compensating a pressure sensor for changes in static pressure.

There are currently many applications for differential pressure sensors. Such sensors often include a sensor housing having an inner chamber. A deflectable diaphragm is inserted within the chamber dividing the chamber into two cavities. A first pressure is provided to the first cavity, while a second pressure is provided to the second cavity. Based on the difference in the first and second pressures, the diaphragm deflects.

The diaphragm also typically includes a conductive portion separated from, but aligned with conductive portions on the inner walls of the cavities. The conductive portion on the diaphragm forms a capacitive plate. Similarly, the conductive portions on the inner walls of the cavities also form capacitive plates. Therefore, the capacitive plate on the diaphragm forms a first variable capacitor with the capacitor plate on the interior wall of the first cavity, and a second variable capacitor with the capacitor plate on the interior wall of the second cavity. As the diaphragm deflects due to the differential pressure, the capacitive values of the two variable capacitors change. The pressure sensor provides an output signal representative of the ratio of capacitive values of the variable capacitors, and based on those capacitive values, the differential pressure is determined.

However, problems can arise due to nonlinearities in such a capacitive pressure sensor. For example, stray capacitances in the system can cause nonlinearities which must be compensated.

Also, errors can result due to changes in static pressure. Static pressure, also commonly referred to as line pressure, can be defined in several ways. For example, the first and second pressures provided to the first and second cavities of the pressure sensor may have values of, 2990 psi($P_L$) and 3000 psi($P_H$). In that case, the differential pressure is 10 psi (3000 psi–2990 psi). Static pressure is sometimes defined as the average of $P_H$ and $P_L$, or 2995 psi. Static pressure may also be defined simply as $P_H$, or $P_L$ alone. However, regardless of which definition is used for static pressure, errors in the output signal of the pressure sensor can result based on variations in static pressure.

It is desirable for the differential pressure sensor to provide an output signal which is unaffected by variations in static pressure. For example, where $P_H=3000$ psi and $P_L=2990$ psi, the differential pressure is 10 psi, and the static pressure is 2995 psi (using the average of $P_H$ and $P_L$ as the measurement for static pressure). However, where $P_H=10$ psi and $P_L=0$ psi, the static pressure is 5 psi, but the differential pressure is still 10 psi. Due to certain stresses placed on the housing of the pressure sensor, the output signal of a typical differential pressure sensor may vary 1% per 1000 psi variation in static pressure. Thus, with the example given above, the output signal from the differential pressure may vary significantly with the change in static pressure.

The Frick U.S. Pat. No. 4,370,890, discloses a mechanical configuration for a differential pressure sensor which attempts to eliminate, or compensate for, the unwanted mechanical stresses on the pressure sensor housing due to variation in static pressure. This helps to eliminate variations in the output signal of the differential pressure sensor due to variation in static pressure. However, there is a continuing need for compensation schemes which compensate for variations in the output signal due to variations in static pressure and which can be adjusted by electrical rather than mechanical means.

SUMMARY OF THE INVENTION

In the present invention, capacitive sensing means senses differential pressure and provides a differential pressure signal based on the differential pressure sensed. The capacitive sensing means has a capacitive value which varies with variations in static pressure, the differential pressure signal also varies with variations in static pressure. Capacitive compensation means has a capacitive value fixed relative to variations in static pressure, and is coupled to the capacitive sensing means. The capacitive compensation means compensates the differential pressure signal for variations due to variations in the static pressure.

DETAILED DESCRIPTION OF THE PREFERRED EMBODIMENTS

Figure 1:
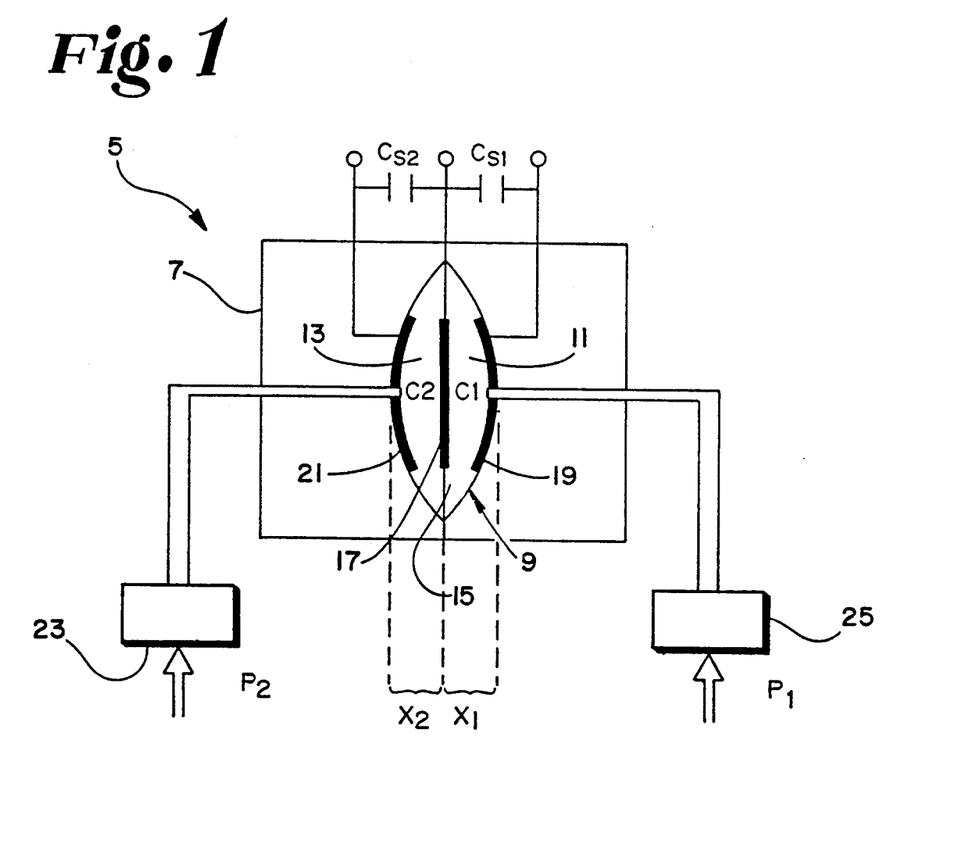
FIG. 1 shows a portion of a differential pressure sensor in partial block diagram form.

FIG. 1 shows a differential pressure sensor 5 which includes a housing 7 having an inner chamber 9 filled with oil having a dielectric coefficient $\epsilon_0$. The inner chamber 9 is divided into a first cavity 11 and a second cavity 13 by diaphragm 15. Diaphragm 15 includes a conductive portion 17 which is generally aligned with, but separated from two other conductive portions, 19 and 21, on the inner surfaces of cavities 11 and 13, respectively.

Conductive portions 17 and 19 form two plates of a variable capacitor $C_1$ separated at their centers by a distance $X_1$. Conductive portions 17 and 21 form two plates of a second variable capacitor $C_2$ separated at their centers by a distance $X_2$. Two pressures, indicated by arrows $P_1$ and $P_2$, are provided by any suitable means, 23 and 25, to cavities 11 and 13. The means for providing pressures $P_1$ and $P_2$ to cavities 11 and 13 are preferably similar to those discussed in more detail in the Frick U.S. Pat. No. 4,370,890.

Depending on the difference between pressures $P_1$ and $P_2$, diaphragm 15 deflects within chamber 11 either toward plate 19 or toward plate 21. This deflection causes a change in the capacitive values of variable capacitors $C_1$ and $C_2$. Sensor 5 provides an output signal representative of the capacitive values of the variable capacitors $C_1$ and $C_2$ and stray capacitances $C_{S1}$ and $C_{S2}$. Based on the output signal, the differential pressure is determined.

However, where the static pressure applied to capacitive pressure sensor 5 varies, stresses are placed on housing 7. These stresses create variation in the capacitive values of variable capacitors $C_1$ and $C_2$. This results in errors in the output signal of capacitive pressure sensor 5.

Figure 2:
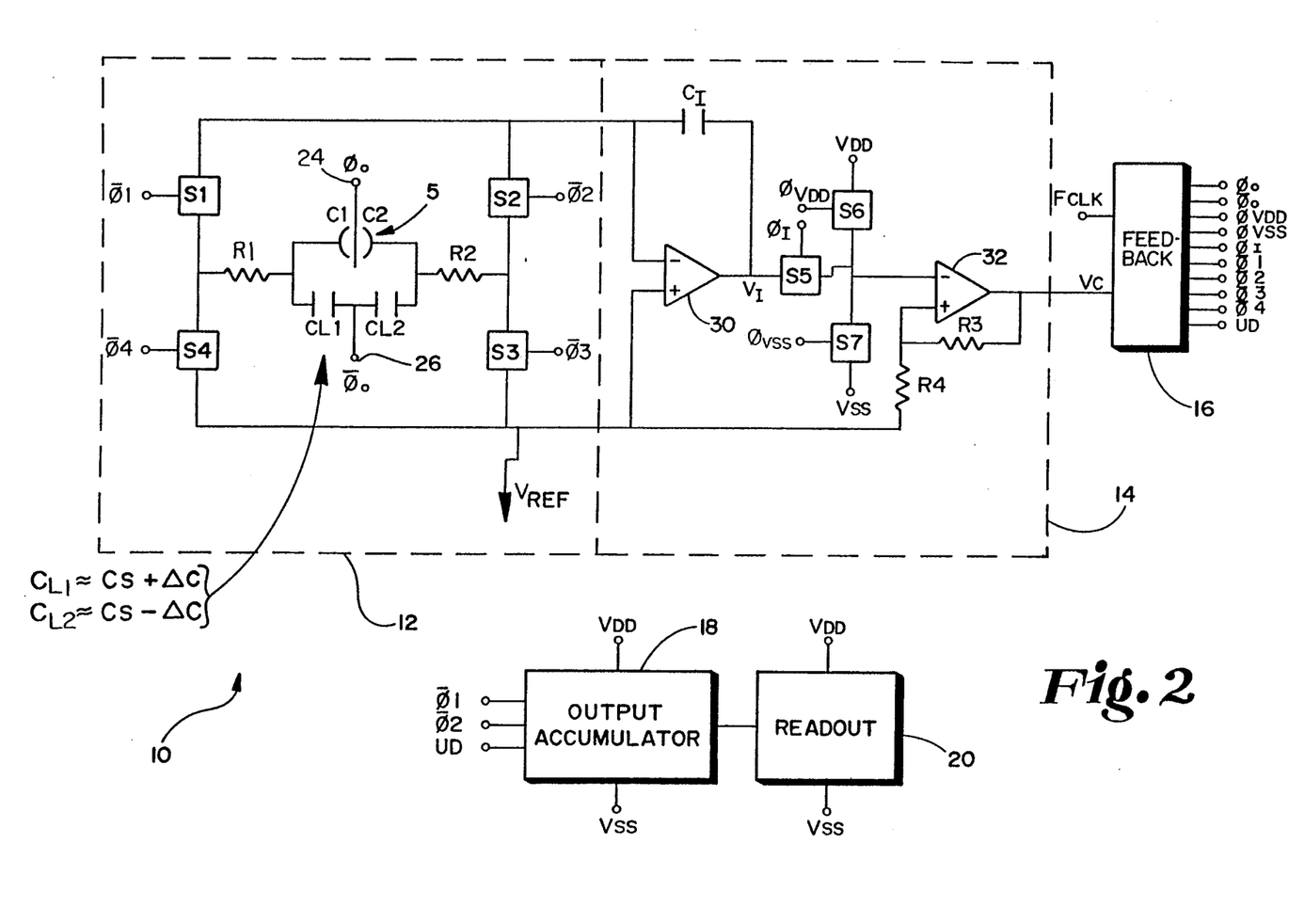
FIG. 2 is a schematic diagram of a differential pressure sensor with one embodiment of capacitive compensation according to the present invention.

FIG. 2 shows one preferred embodiment of a charge balanced feedback transmitter using compensation according to the present invention. Measurement circuit 10 includes charge packet generator circuit 12, integration and comparison circuit 14, feedback circuit 16, output circuit 18 and readout circuit 20.

Charge packet generator circuit 12 includes capacitive pressure sensor 5 which schematically shows the pair of variable capacitors $C_1$ and $C_2$. Capacitors $C_1$ and $C_2$, as described above, have a capacitance value which varies as a function of differential pressure.

Charge packet generator circuit 12 also includes linearity correction capacitors $C_{L1}$ and $C_{L2}$, noise suppression resistors R1 and R2, and switches S1, S2, S3 and S4. Capacitors $C_{L1}$ and $C_{L2}$ are connected in series with one another and in parallel with capacitive sensor 5. Complementary drive signals $\phi_0$ and $\overline{\phi_0}$ are supplied to nodes 24 and 26, respectively. Node 24 is connected to center capacitor plate 17 of sensor 5, while node 26 is connected to the junction of capacitors $C_{L1}$ and $C_{L2}$.

Resistor R1 is connected at one end to capacitors $C_1$ and $C_{L1}$ and at its opposite end to switches S1 and S4. Similarly, resistor R2 is connected at one end to capacitors $C_2$ and $C_{L2}$, and at its opposite end to switches S2 and S3. Drive signals $\phi_1$, $\phi_2$, $\phi_3$ and $\phi_4$ control the conductive states of switches S1, S2, S3 and S4, respectively.

Switches S1 and S2 are connected together to the inverting ($-$) input of integrator amplifier 30 in integrating and comparing circuit 14. Switches S3 and S4 are connected to reference potential $V_{REF}$ and to the non-inverting ($+$) input of integrator amplifier 30. In a preferred embodiment, reference voltage $V_{REF}$ is midway between supply voltages $V_{DD}$ and $V_{SS}$.

Integrating and comparing circuit 14 also includes integration capacitor $C_I$, switches S5, S6, and S7 resistors R3 and R4, and comparator 32. Switches S5, S6 and S7 are controlled by signals $\phi_I$, $\phi_{VDD}$ and $\phi_{VSS}$, respectively, to form a multiplexer for supplying integrator voltage $V_I$, supply voltage $V_{DD}$, or supply voltage $V_{SS}$ to the inverting ($-$) input of comparator 32. Resistor R3 is connected between the output of comparator 32 and its non-inverting ($+$) input, and resistor R4 is connected between the non-inverting ($+$) input of comparator 32 and $V_{REF}$ to provide hysteresis. As a result, comparator 32 has two different threshold levels possible at its ($+$) input, depending upon the state of its output voltage $V_C$.

Output voltage $V_C$ from comparator 32 is supplied as an input to feedback circuit 16. Based upon the state of signal $V_C$, feedback circuit 16 derives ten signals from a basic clock signal $F_{CLK}$. These signals are $\phi_O$, $\overline{\phi_O}$, $\phi_{VDD}$, $\phi_{SS}$, $\phi_I$, $\phi_1$, $\phi_2$, $\phi_3$, $\phi_4$ and UD.

Feedback circuit 16 controls the charge packets supplied to integrator 30 from charge packet generator circuit 12 to achieve a charge balance over time. One or more charge packets of a first polarity are supplied when the $\phi_1$ signal closes switch S1 and thus connects capacitor $C_1$ and $C_{L1}$ through resistor R1 to the ($-$) input of integrator 30. Charge packets of opposite polarity are provided to integrator 30 when the $\phi_2$ signal causes switch S2 to be closed.

Output circuit 18 receives the $\phi_1$ and $\phi_2$ signals together with the UD signal from feedback circuit 16. The UD signal is indicative of whether the integrator is changing up or down. Output circuit 18 accumulates counts of packets of opposite polarity by counting either up or down, depending on the UD signal. Based upon the counts, output circuit 18 provides an output to readout circuit 20 which is representative of the differential pressure sensed by capacitive sensor 22 (as corrected by linearity capacitors $C_{L1}$ and $C_{L2}$). The timing and operation of measurement circuit 10 is described in greater detail in the Schulte et al U.S. Pat. No. 4,878,012.

The effect of static pressure on the output of a capacitive differential pressure sensor has been found to be significant. In such sensors, change in static pressure results in sensor housing deformation. This deformation causes changes in the capacitive values of variable capacitors $C_1$ and $C_2$, as well as stresses in the center diaphragm. Thus, errors result in the output signal. For example, in some pressure sensors, span errors have been found to be approximately 1% of reading for 1000 pounds per square inch (psi) change in static pressure. Similar zero errors also occur in the output signal at low, or zero differential pressure when the static pressure changes.

To compensate for these errors, $C_{L1}$ and $C_{L2}$ are chosen to have values sufficient to compensate for the zero and span errors caused by variation in static pressure. In determining the proper values for $C_{L1}$ and $C_{L2}$, several steps are taken. First, the transducer is subjected to zero static pressure and the zero and span are measured as differential pressure is varied. Then, the sensor is subjected to maximum static pressure and the resulting changes or errors in zero and span are measured as differential pressure is varied from zero to full scale. Finally, the value of the compensation capacitors $C_{L1}$ and $C_{L2}$ are determined and those capacitors are placed in the circuit to compensate for the errors in differential pressure output induced by static pressure variations.

It should be noted that where only the span error or zero error creates a significant problem, that may be the only error compensated. It should also be noted that the values of capacitors $C_{L1}$ and $C_{L2}$ can also be determined to compensate for linearity errors caused by stray capacitances $C_{S1}$ and $C_{S2}$. This is described more fully in the Schulte et al U.S. Pat. No. 4,878,012.

The transfer function used in many differential pressure sensors, such as sensor 5, is:

$$\Delta P \propto \text{transfer fcn.} = \frac{C_1 - C_2 - C_{L1} + C_{L2}}{C_1 + C_2 - C_{L1} - C_{L2}} \qquad \text{Eqn. 1}$$

where $\Delta P$ = differential pressure;
$C_1$ = capacitance value of variable capacitor $C_1$;
$C_2$ = capacitance value of variable capacitor $C_2$; and
$C_{L1} + C_{L2}$ = the capacitance value of the fixed compensation capacitors.

In a sensor in which there is an increase in cavity depth resulting from, and being roughly proportional to, line pressure and in which there is an increase in dielectric constant resulting from and being roughly proportional to line pressure, then;

$$C_1 + C_2 \propto \left( \frac{\epsilon_0}{x_1} + \frac{\epsilon_0}{x_2} \right) = \epsilon_0 \left( \frac{1}{x_1} + \frac{1}{x_2} \right) \quad \text{Eqn. 2}$$

and where $$\frac{x_1 + x_2}{2} = x_0 = \text{nominal cavity depth}$$

partial differentiation shows that $$\frac{\partial(C_1 + C_2)}{(C_1 + C_2)\partial P_L} = \frac{\partial \epsilon_0}{\epsilon_0 \partial P_L} - \frac{\partial x_0}{x_0 \partial P_L} \quad \text{Eqn. 3}$$

Thus, if $$\frac{\partial \epsilon_0}{\epsilon_0 \partial P_L} \neq \frac{\partial x_0}{x_0 \partial P_L}$$

then $$C_1 + C_2 = (C_{01} + C_{02}) \left( 1 + \frac{\partial(C_1 + C_2)}{(C_1 + C_2)\partial P_L} P_L \right)$$

and $C_1 + C_2$ is a linear function of $P_L$ where
$\epsilon_0$ = dielectric coefficient of the oil fill;
$C_{01}$ and $C_{02}$ = the capacitance value of $C_1$ and $C_2$ which does not change with variation in $P_L$; and Thus, one transfer function which can be implemented to compensate for variation due to changes in the static pressure is:

$$\Delta P \propto \frac{C_1 - C_2 - K_1}{C_1 + C_2 - K_2} \quad \text{Eqn. 4}$$

$K_1$ and $K_2$ are line pressure compensator terms; $K_1$ compensates primarily for zero errors and $K_2$ compensates for span errors due to changes in static pressure;

$K_1 = C_{L1} - C_{L2}$;

$K_2 = C_{L1} + C_{L2}$;

and $C_{L1}$ and $C_{L2}$ are fixed capacitors that do not vary with line pressure.

A preferred method of implementing this transfer function is by selecting capacitors $C_{L1}$ and $C_{L2}$ based on line pressure errors measured with known standard values of $C_{L1}$ and $C_{L2}$, then selecting new values for $C_{L1}$ and $C_{L2}$ that can be predicted to reduce line pressure errors to acceptable levels. After installation of these capacitors the transmitter is then compensated for output linearity errors as a function of differential pressure and output errors caused by temperature variations, preferably by well-known digital techniques.

As a specific example, the shifts in the sensor with static pressure are compensated as follows. The output of the capacitive pressure sensor (Output) is described by the transfer function:

$$\text{Output} \propto \frac{C_{A1} - C_{A2} + C_{S1} - C_{S2} - C_{L1} + C_{L2}}{C_{A1} + C_{A2} + C_{S1} + C_{S2} - C_{L1} - C_{L2}} \quad \text{Eqn. 5}$$

which is approximately proportional to $\Delta P$ where,
$C_{A1}$ = active variable capacitance of capacitor $C_1$ that increases with $\Delta P$;
$C_{A2}$ = active variable capacitance of capacitor $C_2$ that decreases with $\Delta P$;
$C_{S1}$ = stray capacitance in parallel with $C_{A1}$;
$C_{S2}$ = stray capacitance in parallel with $C_{A2}$;
$C_{L1}$ = linearity correction capacitor that subtracts from $C_1$;
$C_{L2}$ = linearity correction capacitor that subtracts from $C_2$;
$P_L$ = static pressure; and
$\Delta P$ = differential pressure.

With a typical metal cell sensor:

$$\Delta P \text{ is approximately proportional to } R \approx \frac{C_1 - C_2}{C_1 + C_2} \quad \text{Eqn. 6}$$

where R = ratio output.
Also, for a typical cell $$\frac{\partial(C_1 + C_2)}{(C_1 + C_2)\partial P_L} \approx -1\% \text{ per 1000 psi} \quad \text{Eqn. 7}$$

since $$\frac{\partial(C_1 + C_2)}{(C_1 + C_2)\partial P_L} = \frac{\partial \epsilon_0}{\epsilon_0 \partial P_L} - \frac{\partial x_0}{x_0 \partial P_L} =$$

$$+.5\%/1000 \text{ psi} - 1.5\%/1000 \text{ psi} = -1\%/1000 \text{ psi}$$

For example, if the zero shift with static pressure is measured with $C_{L1} \approx C_{S1}$, $C_{L2} \approx C_{S2}$ and $C_{L1} = C_{L2}$ then:

$$R = \frac{C_1 - C_2}{C_1 + C_2} = \frac{0}{C_1 + C_2} = 0 \quad \text{Eqn. 8}$$

at $\Delta P = 0$ since $C_1 \approx C_2$. Thus, the output will not change when $C_1 + C_2$ decreases with static pressure. However, if $C_{L1}$ is decreased by a quantity $\Delta C$ and $C_{L2}$ is increased by the quantity $\Delta C$, a zero shift with static pressure will be induced as follows:

$$R_0(@\Delta P = 0) = \frac{C_1 - C_2 - \Delta C - \Delta C}{C_1 + C_2 + \Delta C - \Delta C} = -\frac{2\Delta C}{C_1 + C_2} \neq 0 \quad \text{Eqn. 9}$$

This new zero output level will change when $C_1 + C_2$ decreases with static pressure (e.g., where $$\frac{\partial(C_1 + C_2)}{(C_1 + C_2)\partial P_L} \approx -1\%/1000 \text{ psi change in static pressure.})$$

Since the numerator is now nonzero, the ratio output (R) will be a function of static pressure. The percent change as a function of full scale output where $\Delta P$ = full scale and the nominal ratio output (R) = +0.5 will be as follows:

$$\frac{\% \text{ ZeroShift}}{1000 \text{ psi}} \text{ as a percent of full scale } \Delta P \approx \quad \text{Eqn. 10}$$

$$\frac{R(\text{at } \Delta P = 0, P_L = 1000 \text{ psi}) - R(\text{at } \Delta P = 0, P_L = 0 \text{ psi})}{R \text{ Full Scale}} \times 100 \approx$$

$$\frac{\left(\frac{-2\Delta C}{C_1 + C_2} - \frac{2\Delta C}{(C_1 + C_2)\left(1 + \frac{\partial(C_1 + C_2)}{(C_1 + C_2)\partial P_L}\right)}\right)}{0.50} \times 100$$

where $$\frac{\partial(C_1 + C_2)}{(C_1 + C_2)\partial P_L} = -.01/1000 \text{ psi.} \quad \text{Eqn. 11}$$

$$\approx \frac{\left(\frac{-2\Delta C}{C_1 + C_2} - \frac{(2\Delta C)(1 + 0.01)}{C_1 + C_2}\right) \times 100}{0.5}$$

$$\approx \frac{-0.01}{0.5} \times 100 \times \frac{2\Delta C}{C_1 + C_2}$$

$$= -4\%/1000 \text{ psi} \times \frac{\Delta C}{C_1 + C_2}$$

$$\approx -4\%/1000 \text{ psi} \times \frac{\Delta C}{40 \text{ pf} + 40 \text{ pf}}$$

if $C_1 \approx C_2 \approx 40$ pf.

For $\Delta C = 1$ pf:

$$\frac{\% \text{ Zero Shift}}{1000 \text{ psi} \cdot \text{pf}} = -4\% \left(\frac{1 \text{ pf}}{80 \text{ pf}}\right) \text{per} \quad \text{Eqn. 12}$$

$$1000 \text{ psi} = \frac{-0.05\%}{1000 \text{ psi}}$$

Thus, for a zero correction of $-0.1\%$ per 1000 psi, a correction of $\Delta C = 2$ pf is needed. In other words, for a negative 0.1% per 1000 psi correction, a proper adjustment would be to increase $C_{L1}$ by 2 pf and decrease $C_{L2}$ by 2 pf from their nominal values.

$$C_{L1} \approx C_{S_i} + \Delta C$$

$$C_{L2} \approx C_{S2} - \Delta C \quad \text{Eqn: 13}$$

Recall that $C_{L1}$ is the linearity capacitor that subtracts from and is physically connected to the variable sensor capacitor $C_1$ which increases with $\Delta P$. These corrections could be made by switching capacitor arrays available in circuit 10 into or out of the circuit to achieve the proper levels through the use of a controller.

In the prior art, values of $C_{L1}$ and $C_{L2}$ have been chosen to be nominally equal to $C_{S1}$ and $C_{S2}$. This minimizes nonlinearity errors in the output as a function of $\Delta P$ and minimizes variations in output due to temperature variations that cause the dielectric constant to shift. Since this technique causes $C_{L1}$ and $C_{L2}$ to deviate from these ideal values the sensor output will require increased compensation for these errors. Since prior art transmitters incorporate digital correction algorithms for these errors, it is a simple matter to characterize and compensate the transmitter for these errors after installation of $C_{L1}$ and $C_{L2}$ which are chosen to minimize line pressure errors. Thus overall performance of the transmitter is enhanced.

If span compensation is desired in addition to or instead of zero compensation the term $K_2 = C_{L1} + C_{L1}$ is adjusted in a similar manner. Since $$R = \frac{C_1 - C_2}{C_1 + C_2 - K_2}$$

it can be shown that $$\frac{\% \text{ spanshift}}{1000 \text{ psi}} = \left(\frac{K_2}{C_1 + C_2}\right)\left(\frac{\partial(C_1 + C_2)}{(C_1 + C_2)\partial P_L}\right)$$

Thus, if $K_2$ is changed by 2 pf ($C_{L1} = +1$ pf, $C_{L2} = +1$ pf) then the %spanshift $C_{L2} = +1$ pf) then the % spanshift =

$$\left(\frac{2 \text{ pf}}{80 \text{ pf}}\right)\left(\frac{-1\%}{1000 \text{ psi}}\right) = -0.025\% \text{ per } 1000 \text{ psi}.$$

It should be noted that in a preferred embodiment, $C_{L1}$ and $C_{L2}$ are chosen with a temperature coefficient substantially equal to the temperature coefficient of the dielectric constant of the oil fill. Also, $C_{L1}$ and $C_{L2}$ are placed very close to sensor 5 so the temperatures of $CL_1$ and $CL_2$ and sensor 5 are very close.

In still another embodiment, the capacitive compensation means can take forms other than a pair of capacitor $CL_1$ and $CL_2$. For example, a single compensation capacitor with a varying excitation voltage and selective switching of nodes can also accomplish the compensation feature of the present invention.

Although the present invention has been described with reference to preferred embodiments, workers skilled in the art will recognize that changes may be made in form and detail without departing from the spirit and scope of the invention.

What is claimed is:

1. An apparatus for measuring differential pressure in a two-wire transmitter, comprising:

capacitive sensing means for sensing differential pressure and having a capacitance valve which varies with static pressure, the capacitance sensing means providing a differential pressure signal based on the differential pressure sensed, the differential pressure signal varying with variations in static pressure; and capacitive compensation means, having a capacitance value which remains substantially unchanged by variations in static pressure for compensating the differential pressure signal for variations due to variations in the static pressure.

2. The apparatus of claim 1 wherein the capacitive compensation means comprises:

a first capacitive compensator having a capacitance value $C_{L1}$ and being coupled to the capacitive sensing means to compensate the differential pressure signal for errors caused by variation in the static pressure; and a second capacitive compensator having a capacitance value $C_{L2}$ and being coupled to the capacitive sensing means to compensate the differential pressure signal for errors caused by variation in the static pressure.

3. The apparatus of claim 2 wherein $CL_1$ and $CL_2$ have values so that $CL_1 - C_{L2}$ compensates for zero errors in the differential pressure signal.

4. The apparatus of claim 2 wherein $C_{L1}$ and $C_{L2}$ have values so that $C_{L1}+C_{L2}$ compensates for span errors in the differential pressure signal.

5. The apparatus of claim 2 wherein the capacitive sensing means comprises:
   a first variable capacitor having a capacitance value $C_1$ which varies with differential pressure and static pressure; and
   a second variable capacitor having a capacitance value $C_2$ which varies with differential pressure and static pressure.

6. The apparatus of claim 5 wherein the differential pressure signal is proportional to $$\frac{C_1 - C_2 - C_{L1} + C_{L2}}{C_1 + C_2 - C_{L1} - C_{L2}}.$$

7. The apparatus of claim 5 wherein the capacitive sensing means comprises:
   a housing having a cavity;
   oil filling the cavity and having a dielectric coefficient, $\epsilon_0$;
   a diaphragm extending across the cavity dividing the cavity into first and second chambers, the diaphragm having at least one conductive portion forming a first plate;
   a second conductive portion coupled to the first chamber and spaced from the conductive portion of the diaphragm by a distance $X_1$ to form a second plate of the first variable capacitor; and
   a third conductive portion coupled to the second chamber and spaced from the conductive portion of the diaphragm by a distance $X_2$ to form a second plate of the second variable capacitor.

8. The apparatus of claim 7 wherein the cavity has a nominal depth $X_0$, wherein static pressure is represented by $P_L$, and wherein $$\frac{\delta(C_1 + C_2)}{(C_1 + C_2)\delta P_L} = \frac{\delta\epsilon_0}{\epsilon_0 \delta P_L} - \frac{\delta X_0}{X_0 \delta P_L} \geq 0.1\%$$

per 1000 psi variation in $P_L$.

9. The apparatus of claim 7 wherein the capacitive compensation means is thermally proximate the capacitive sensing means, and wherein the capacitive compensation means has a temperature coefficient substantially equal to a temperature coefficient of the dielectric coefficient of the oil filling.

10. The apparatus of claim 1 wherein the differential pressure signal varies due to temperature variation and stray capacitance, and further comprising:
    means for compensating the differential pressure signal due to variations in temperature and stray capacitance, the means for compensating performing a compensation step after the capacitive compensation means is selected.

11. A capacitive pressure transducer, comprising:
    a housing having a cavity;
    a diaphragm extending across the cavity dividing the cavity into first and second chambers, the diaphragm having at least one conductive portion forming a first plate;
    a second conductive portion coupled to the first chamber and spaced from the conductive portion of the diaphragm to form a second plate of a first variable sensing capacitor having a variable capacitance value $C_1$;
    a third conductive portion coupled to the second chamber and spaced from the conductive portion of the diaphragm to form a second plate of a second variable sensing capacitor having a variable capacitance value $C_2$;
    pressure means for applying a first pressure to the first chamber and a second pressure to the second chamber causing the diaphragm to deflect and change the variable capacitance values of the first and second variable sensing capacitors in response to a differential between the first and second pressures, that differential being differential pressure, the variable capacitance values also varying as a result of variation in static pressure; and
    capacitive compensation means having a capacitance value substantially unaffected by variations in static pressure and being coupled to the variable sensing capacitors for compensating for the variation in the variable capacitance values due to variation in the static pressure.

12. The capacitive pressure transducer of claim 11 wherein the capacitive compensation means comprises:
    a first capacitor coupled to at least one of the variable sensing capacitors and having a capacitance value $C_{L1}$ selected to compensate for the variation in the variable capacitance values caused by variation in the static pressure.

13. The capacitive pressure transducer of claim 12 wherein the capacitive compensation means comprises:
    the second capacitor coupled to at least one of the variable sensing capacitors and having a capacitance value $C_{L2}$ selected to compensate for the variation in the variable capacitance values caused by variation in the static pressure.

14. The capacitive pressure transducer of claim 13 wherein the first and second capacitors have values so that $C_{L1}+C_{L2}$ compensates for span errors due to variation in static pressure.

15. The capacitive pressure transducer of claim 13 wherein the first and second capacitors have values so that $C_{L1}-C_{L2}$ compensates for zero errors due to variation in static pressure.

16. The capacitive pressure transducer of claim 11 wherein the capacitive compensation means comprises:
    a plurality of capacitors coupled to the variable sensing capacitors and having capacitance values that compensate for variations in the variable sensing capacitors caused by variation in static pressure.

17. The capacitive pressure transducer of claim 11 wherein the capacitive compensation means is located thermally proximate the housing.

18. The capacitive pressure transducer of claim 13 wherein the differential pressure is proportional to $$\frac{C_1 - C_2 - C_{L1} + C_{L2}}{C_1 + C_2 - C_{L1} - C_{L2}}.$$

19. A capacitive pressure sensor for sensing differential pressure in a two-wire transmitter, comprising:
    a capacitive pressure transducer having capacitive values varying with variations in static pressure and being suitable for being exposed to first and second pressures and providing a differential pressure signal representative of a differential pressure between the first and second pressures, wherein the differential pressure signal varies based on variations in static pressure;

a first capacitor, coupled to the capacitive pressure transducer, having a value $CL_1$; and a second capacitor, coupled to the capacitive pressure transducer, having a capacitance value $CL_2$, wherein the capacitance values of the first and second capacitors are substantially unchanged by variations in static pressure and are coupled to compensate the differential pressure signal for variations caused by variations in static pressure.

20. The capacitive pressure sensor of claim 19 wherein the capacitance values of the first and second capacitors compensate the differential pressure signal for span errors resulting from variation in the static pressure.

21. The capacitive pressure sensor of claim 19 wherein the capacitance values of the first and second capacitors compensate the differential pressure signal for zero errors resulting from variation in the static pressure.

22. The capacitive pressure sensor of claim 19 wherein the capacitance values of the first and second capacitors partially compensate the differential pressure signal for stray capacitance.

* * * * *

UNITED STATES PATENT AND TRADEMARK OFFICE
CERTIFICATE OF CORRECTION

PATENT NO. : 5,163,326

DATED : November 17, 1992

INVENTOR(S) : Roger L. Frick

It is certified that error appears in the above-identified patent and that said Letters Patent is hereby corrected as shown below:

Col. 3, line 36, delete: "$\Phi_1, \Phi_2, \Phi_3$ and $\Phi_4$", insert --$\overline{\Phi}_1, \overline{\Phi}_2, \overline{\Phi}_3$ and $\overline{\Phi}_4$ --.

Col. 3, lines 63-64, delete: $\Phi_0, \Phi_0, \Phi_{VDD}, \Phi_{SS}, \Phi_1, \Phi_1, \Phi_2, \Phi_3, \Phi_4$", insert --$\Phi_0, \overline{\Phi}_0, \Phi_{VDD}, \Phi_{VSS}, \Phi_1, \overline{\Phi}_1, \overline{\Phi}_2, \overline{\Phi}_3, \overline{\Phi}_4$, --.

Col. 4, line 1, delete "$\Phi_1$", insert --$\overline{\Phi}_1$--.

Col. 4, line 4, delete "$\Phi_2$", insert --$\overline{\Phi}_2$--.

Col. 4, line 6, delete "$\Phi_1$" and $\Phi_2$", insert --$\overline{\Phi}_1$ and $\overline{\Phi}_2$--.

Col. 5, line 33, after "; and", insert --$P_1$ = static pressure (or line pressure).--.

Col. 7, line 67, delete "$K_2 = C_{L1} + C_{L1}$", insert --$K_2 = C_{L1} + C_{12}$--.

UNITED STATES PATENT AND TRADEMARK OFFICE
CERTIFICATE OF CORRECTION

PATENT NO. : 5,163,326
DATED : November 17, 1992
INVENTOR(S) : Roger L. Frick

It is certified that error appears in the above-identified patent and that said Letters Patent is hereby corrected as shown below:

Col. 9, lines 40 and 41, in Claim 8, delete the following:

$$\frac{\delta(C_1+C_2)}{(C_1+C_2)\delta P_L} - \frac{\delta\epsilon_0}{\epsilon_0 \delta P_L} - \frac{\delta X_0}{X_0 \delta P_L} \geq 0.1\%$$

and insert the following:

$$\left|\frac{\delta(C_1+C_2)}{(C_1+C_2)\delta P_L}\right| - \left|\frac{\delta\epsilon_{04}}{\epsilon_0 \delta P_L} - \frac{\delta X_0}{X_0 \delta P_L}\right| \geq 0.1\%$$

Signed and Sealed this

Twenty-fifth Day of January, 1994

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5,163,326
DATED : November 17, 1992
INVENTOR(S) : Roger L. Frick et al.

It is certified that error appears in the above-indentified patent and that said Letters Patent is hereby corrected as shown below:

On the title page item,
[75] Inventor:

add --David A. Broden, Chanhassen, Minn.;
Bennett L. Louwagie, Plymouth, Minn.--

Signed and Sealed this

Thirtieth Day of April, 1996

Attest:

BRUCE LEHMAN

*Attesting Officer*    *Commissioner of Patents and Trademarks*